US006854252B2

(12) United States Patent
Foster

(10) Patent No.: US 6,854,252 B2
(45) Date of Patent: Feb. 15, 2005

(54) COMMERCIAL RIDING MOWER

(76) Inventor: Robert Foster, 5406 W. Main, Newport, AR (US) 72112

( * ) Notice: Subject to any disclaimer, the term of this patent is extended or adjusted under 35 U.S.C. 154(b) by 0 days.

(21) Appl. No.: 10/196,966

(22) Filed: Jul. 17, 2002

(65) Prior Publication Data

US 2004/0011013 A1 Jan. 22, 2004

(51) Int. Cl.⁷ .............................................. A01D 67/00
(52) U.S. Cl. ...................................................... 56/320.1
(58) Field of Search .......................... 56/6, 320.1, 11.9, 56/320.2, DIG. 9, DIG. 24

(56) References Cited

U.S. PATENT DOCUMENTS

| | | | | |
|---|---|---|---|---|
| 4,114,353 A | * | 9/1978 | Ansbaugh et al. | ............ 56/13.3 |
| 4,268,997 A | * | 5/1981 | Conkey | ........................ 49/383 |
| 4,411,464 A | * | 10/1983 | Bauer | ......................... 296/102 |
| 4,454,926 A | * | 6/1984 | Akins | ......................... 180/68.1 |
| 4,589,249 A | * | 5/1986 | Walker et al. | ................ 56/16.6 |
| 4,679,382 A | * | 7/1987 | Saruhashi et al. | ............ 56/10.1 |
| 4,848,498 A | * | 7/1989 | Hart et al. | .................. 180/69.2 |
| 5,199,521 A | * | 4/1993 | Samejima et al. | .......... 180/68.1 |
| 5,280,695 A | * | 1/1994 | Nunes et al. | ..................... 56/6 |
| 6,062,333 A | * | 5/2000 | Gordon | ....................... 180/311 |
| 6,105,349 A | * | 8/2000 | Busboom et al. | ............. 56/14.7 |

* cited by examiner

Primary Examiner—Thomas B. Will
Assistant Examiner—Alicia Torres
(74) Attorney, Agent, or Firm—Dennis B. Haase

(57) ABSTRACT

A commercial riding mower with a chassis built on a relatively rigid frame and having a number of operating systems such as the power plant, motive system, cutter drive system, and fuel storage and delivery system, each of which is accessible through a swing away panel, or hatch, for easy maintenance and repair without compromising safety of the operator or anyone in close proximity to the mower in operation, or impairing the structural integrity of the mower.

7 Claims, 5 Drawing Sheets

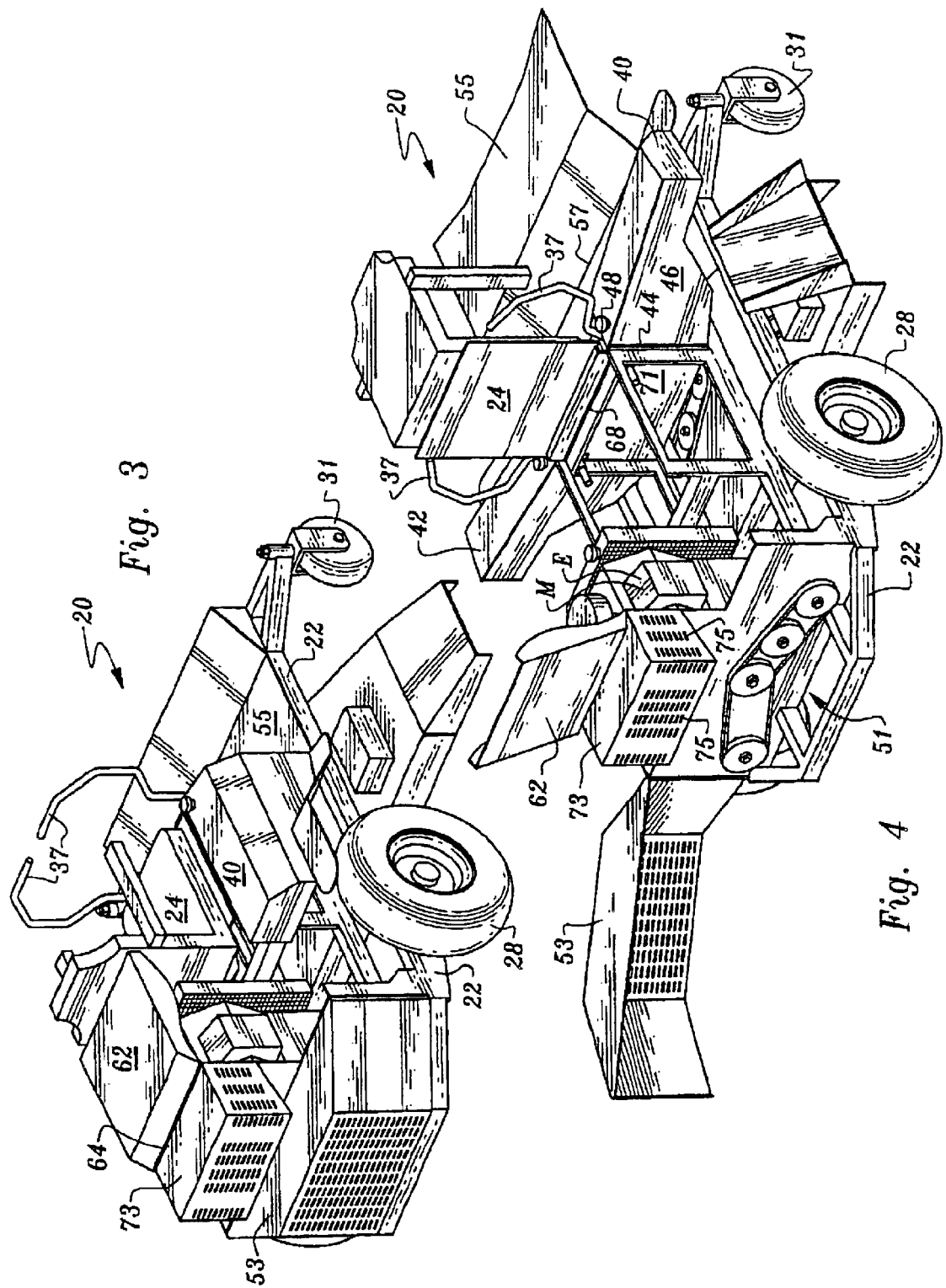

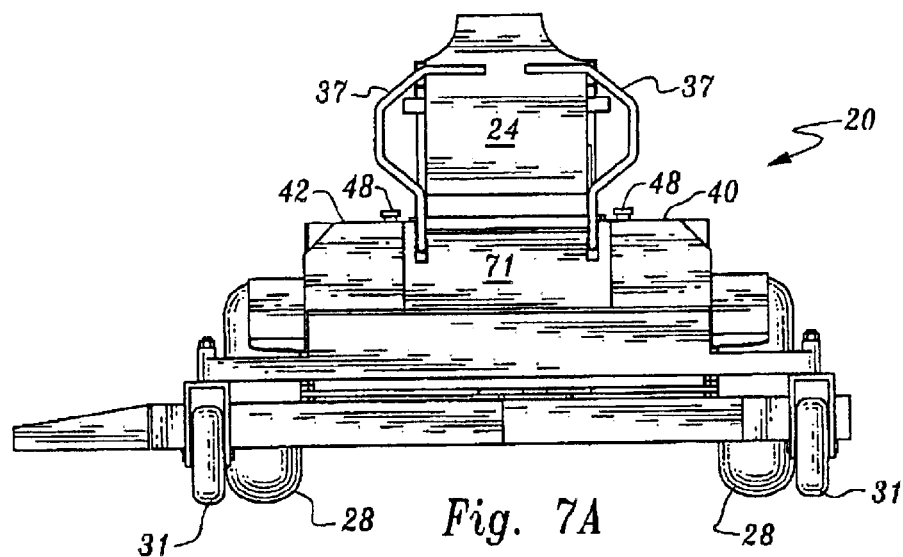
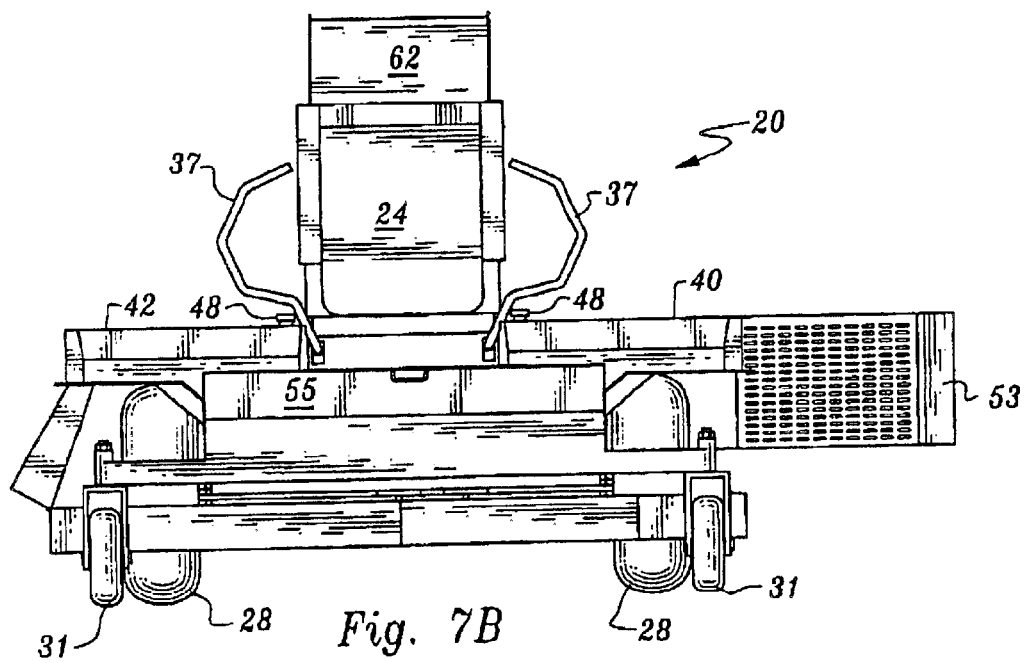

COMMERCIAL RIDING MOWER

The present invention relates to commercial riding mowers, and particularly to improvements therein to the accessability of internal working parts to thereby enhance maintenance and repair resulting in greatly increased efficiency and economy of cost.

BACKGROUND OF THE INVENTION

1. Field of the Invention

Commercial riding mowers, while built to withstand far more stringent conditions and for longer periods than the familiar lawn tractor that many have around the house, they are still mechanical devices and subject to all of the vagaries of such devices.

Such mowers require regular service and preventive maintenance and, in addition, are, by virtue of the adverse environment in, which they operate, the subject to breakdowns, all of which take time, and time is money. It is not uncommon to see such devices in various stages of disrepair along the roadway, or up on jacks or a trailer where the mechanic, or, in some cases, the driver, can access the motor, mower blades, fuel system, drive system or a combination of one or more of these systems.

Whoever may be working on the mower, is either on his back working above his head, or in some contorted posture in, on, under or below the machine, in an effort to reach a particular system thereof. The result is unproductive time at one end of the scale to a workman's compensation claim at the more drastic end of the scale.

State and federal OSHA rules and regulations intended to protect the driver often dictate design parameters, resulting in any and all moving parts such as belts, pulleys, blades, fuel cells and the like being completely hidden from inadvertent access, and those same regulations tend to hinder access to such parts for maintenance and repair.

2. Overview of the Prior Art

Typical of the type of commercial mower to which the present invention has particular utility is found in Davis, Jr. U.S. Pat. No. 4,395,865. Davis discloses a commercial riding mower in which wing mowers, as well as the main mower, are belt driven and an improved clutching mechanism is provided.

Bushboom U.S. Pat. No. 5,865,020 is another device, similar in purpose to that of Davis, Jr., and provides a multiple pulley drive system. It should be noted that in this patent many of the moving parts are exposed and could cause injury if inadvertently contacted by the driver, or another in close proximity.

Bushboom obtained additional protection for his liquid cooled mower engine in which a self cleaning grille work was featured, as seen in his U.S. Pat. No. 6,105,349. It should be noted that the fuel tank is accessible at the driver's elbow.

It does not appear that existing commercial riding mowers address both safety and convenience for maintenance and repair. Enter the mower of the present invention.

SUMMARY OF THE PRESENT INVENTION

The present invention accomplishes the primary objective, broadly stated, of creating a significant improvement in riding commercial mowers, while coincidently providing optimum safety for those who ride on, and work about, the mower in operation, and substantially enhances the serviceability of the mower by providing strategic access panels to implement safe and convenient maintenance and repair.

It is another objective, related to the foregoing, to retain, if not enhance structural integrity of the mower while accomplishing the foregoing, as well as other objectives of the present invention.

A still more specific objective of the present invention is to provide a commercial riding mower which can be maintained and repaired in the field without recourse to otherwise necessary ancillary equipment such as, for example, portable jacks and jack stands, hoists, and creepers, which are now in common usage, and without which even commonly anticipated repairs would be exceedingly difficult, if not downright impossible.

Yet another objective of the present invention is to provide a commercial riding mower which can be repaired, and maintained in situ, with minimal downtime and commensurate labor time, thereby effecting a significant financial saving over current commercial machines.

The foregoing, as well as other objectives and advantages of the present invention, will become apparent from a further reading of the Detailed Description of a Preferred Embodiment, when taken in conjunction with the drawings, wherein:

DESCRIPTION OF THE DRAWINGS

FIG. 3 is a pictorial representation of the novel mower of the present invention, as shown in FIG. 1, but viewed from the right rear quadrant thereof;

FIG. 4 is a view of the mower of the present invention from the FIG. 3 perspective, and shown with many of the access panels in the open position;

FIG. 7A is a rear elevation of the mower of FIGS. 5A and 6A, illustrating various features of the invention from that viewpoint; and, FIG. 7B is a front elevation of the novel mower of FIG. 7A, illustrating various features from that perspective.

DETAILED DESCRIPTION OF A PREFERRED EMBODIMENT

Figure 1:
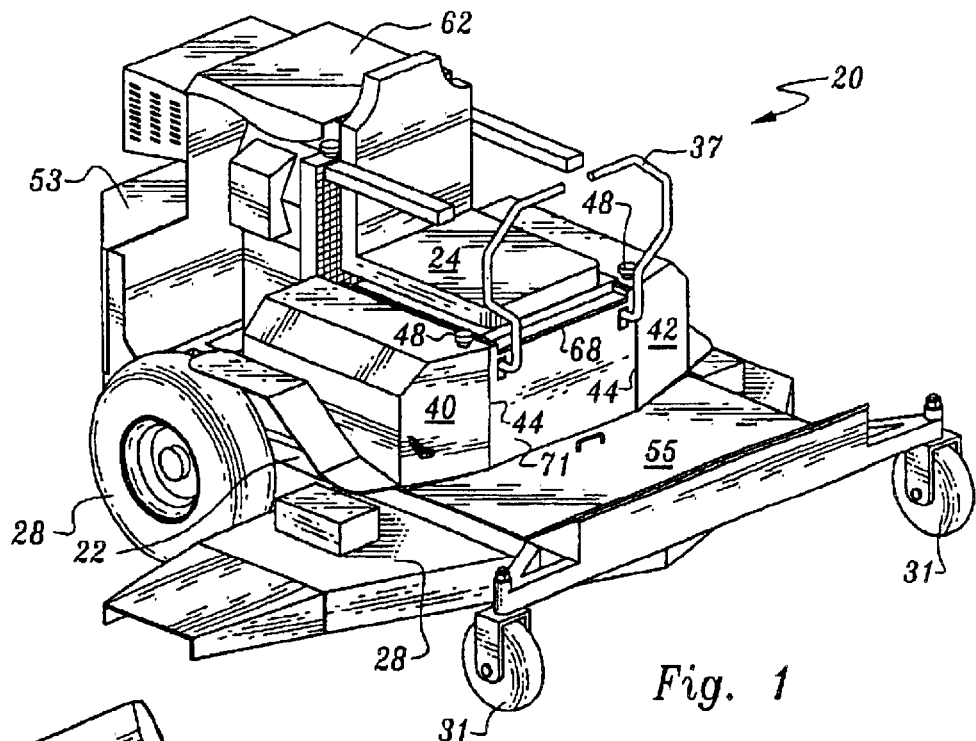
FIG. 1 is a pictorial representation of a commercial riding mower constructed in accordance with the present invention, and illustrating the structure in perspective viewed from the right side thereof.

With reference now to the drawings, and initially to FIG. 1, a commercial riding mower 20 is illustrated and is constructed in accordance with the present invention to move along terrain, irrespective of its attitude, presuming it is not too steep or ridiculously uneven to accommodate any such riding mower.

Figure 2:
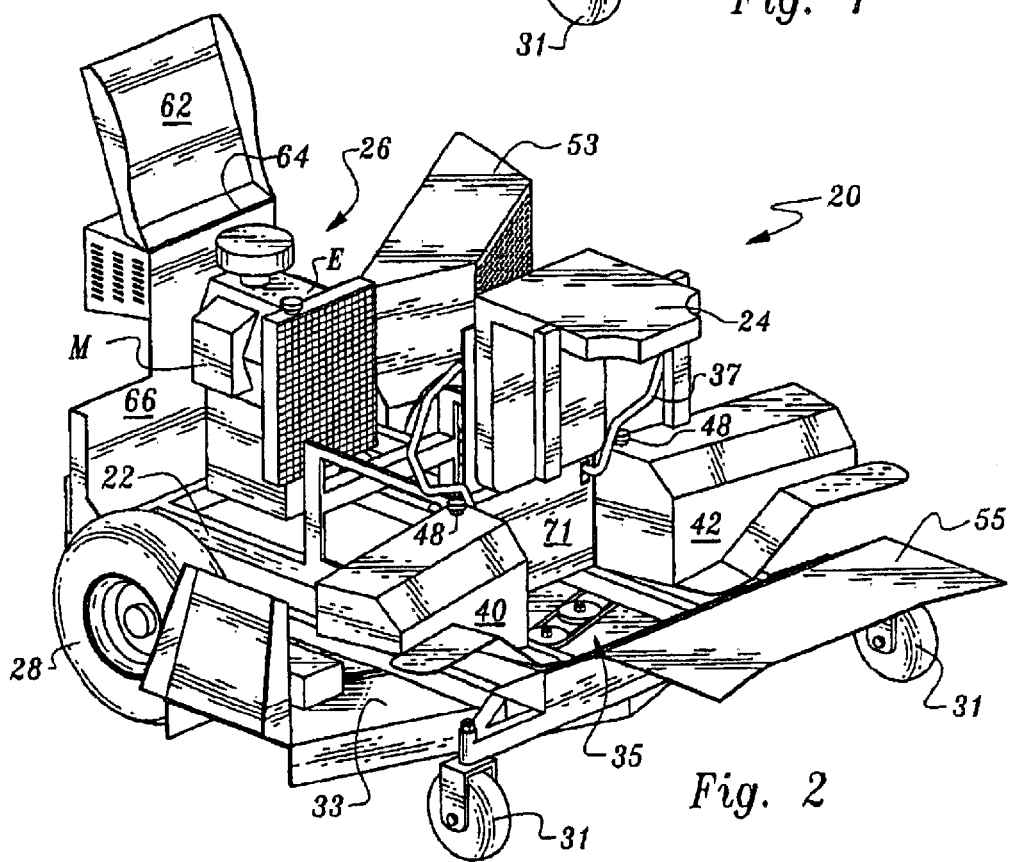
FIG. 2 is a pictorial representation of the mower of FIG. 1, and from the same perspective, but showing the device as it would appear with the various access panels open to expose the various working systems of the mower.
Figure 5A:
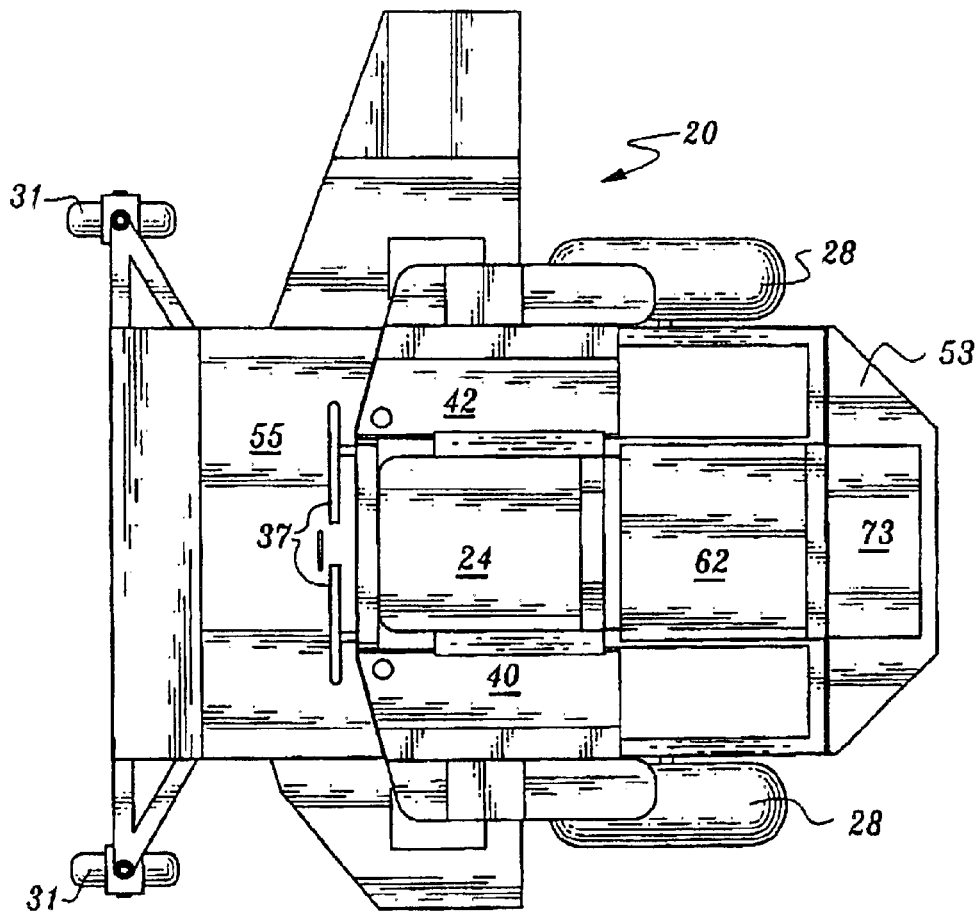
FIG. 5A is a top plan view of the novel mower of FIG. 1 with the mower facing in a direction to move left to right.
Figure 6A:
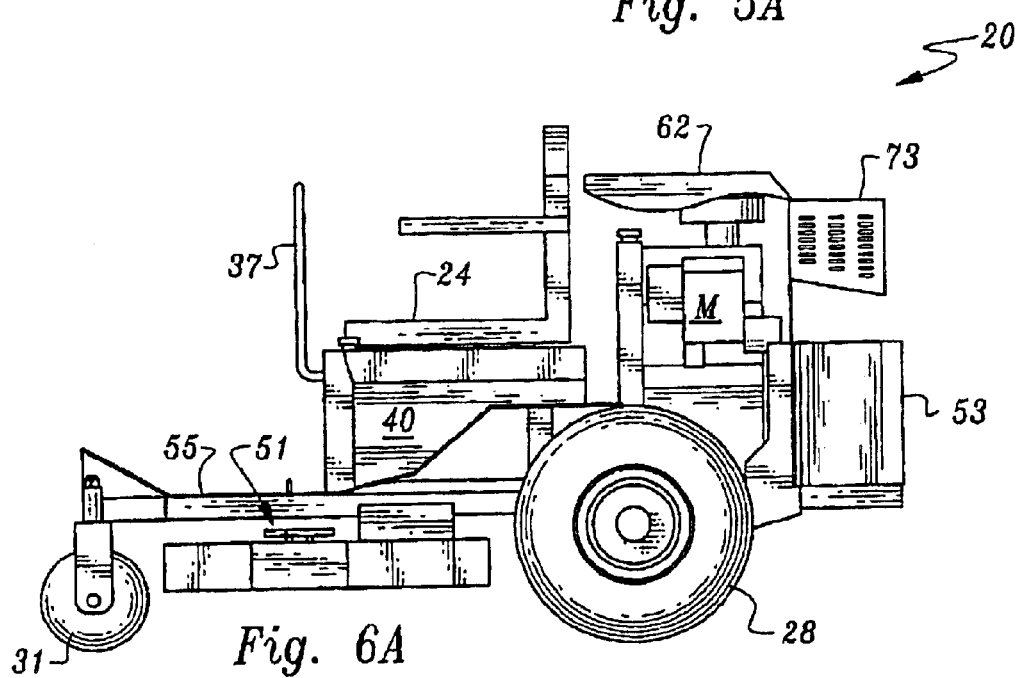
FIG. 6A is a side elevation of the mower of the present invention as seen in FIGS. 5A and 5B, showing the device as it would appear in operation moving right to left.
Figure 5B:
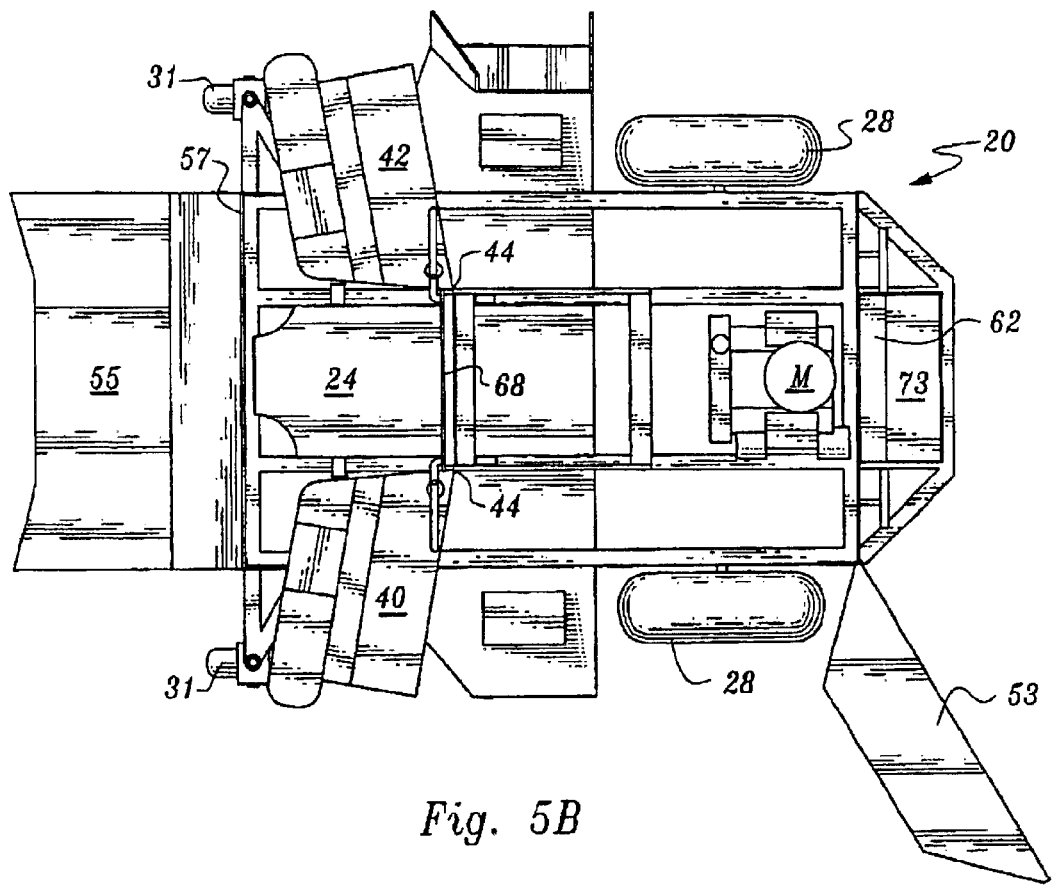
FIG. 5B is the top plan view as shown in FIG. 5A, but with access panels opened.
Figure 6B:
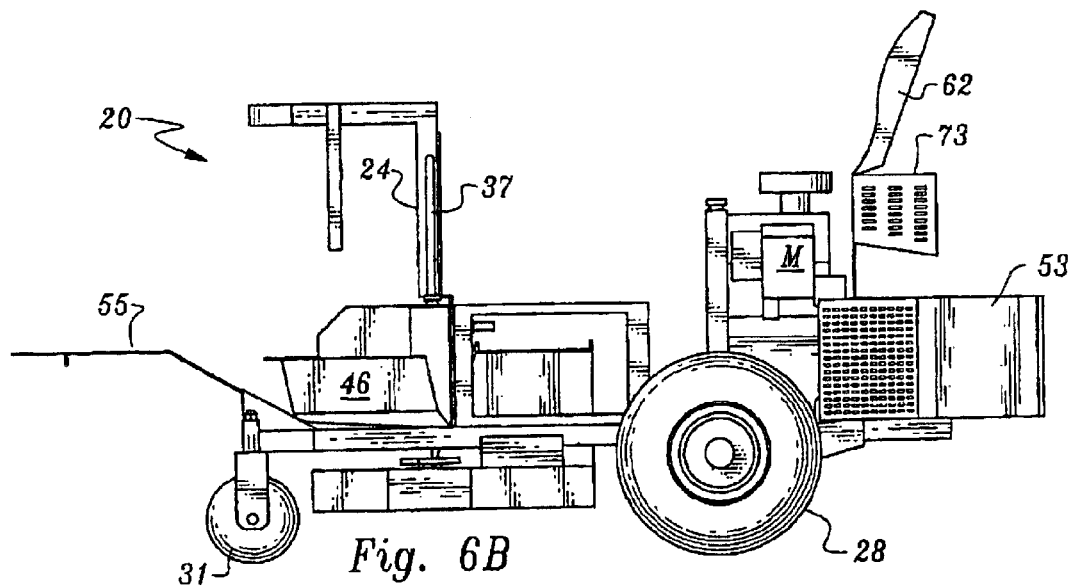
FIG. 6B is a view similar to FIG. 6A, but with the access panels open and the various operating systems exposed.

The mower 20 comprises a chassis supported by a rigid frame 22, shown in part in FIG. 2, upon which a driver's seat 24 is situated approximately amidships of the mower and forward of an engine compartment 26, again referring primarily to FIG. 2. The frame is supported on drive wheels 28 mounted near the rear of the frame 22, and casters 31 at the forward end thereof to facilitate steerage.

A mowing deck 33 depends from the frame 22, which houses multiple rotary cutter units, not specifically illustrated in that they are one of several well known structures. The rotary cutting units are, in the illustrated case, belt driven, as may be seen generally in FIG. 2 at 35, although other types of drives are within the purview of the invention. The mowing deck is height adjustable in order to permit the operator to set the cutting height in accordance with the terrain to be mowed.

The operator, or driver, not shown, is provided with conveniently located steering arms 37, which access a hydraulic drive system, again not specifically shown or described in that it is exemplary only and not germane to the invention. Similarly, and for the same reason, the power plant, comprising in this case a water cooled internal combustion engine E is shown essentially in profile in that it is partially visible in the production model.

A commercial riding mower of the type illustrated is an amalgamation of several systems, including the power plant and a fuel storage and feed system therefor, a hydraulic system, multiple drive systems for the rotary cutters, drive and steering system for the drive wheels, and where, as is the case here, the engine E, is water cooled, a cooling system. All of these systems are typically encased to a greater or lesser extent within several integrated protective coverings, which, in addition to providing a substantial safety element for the driver and those working around the machine as it operates, such covering adds structural strength to the unit itself.

It is axiomatic that all of the various systems enumerated will either require service and/or maintenance at some point and most will require frequent attention by virtue of the dusty conditions in which the device operates.

Common sense safety concerns, not to mention OSHA regulations which may vary from state to state, dictate that substantially all of these systems be protected from inadvertent outside incursion by humans. In order, therefore, to achieve the objectives of the present invention, a series of strategically placed, swingable access panels or hatches are contemplated.

Referring now to FIGS. 2, 4, 5B, 6B, and 7B, perhaps one of the most critical systems on devices such as the mower 20, is the fuel system. It is, of course, the energy source, but it also involves the storage and delivery of a volatile liquid. In order, therefore, to achieve the objectives sought here, the invention contemplates the provision of a pair of opposed independently laterally swingable side panels, or wings, 40 and 42.

Each side panel 40, 42 is hinged to, and when closed becomes a part of, the chassis at its forward end of each wing at 44, so as to swing outwardly away from the driver's sea 24, as illustrated in FIG. 2 of the drawings, in order to avoid inadvertent opening. Additionally, in accordance with the invention, each side panel 40, 42 carries a fuel storage tank 46, protectively disposed on the inside wall of each wing, with a filler spout 48 protruding through the top of each panel. By storing the fuel supply in this manner, fuel filters and lines are easily accessible and the fuel supply is divided so as to minimize the pure volume of volatile liquid located in any one position. Further, the side panels inhibit, when in place, flexing and twisting of the frame, particularly on rough or uneven terrain, thereby enhancing the overall durability of the mower.

Another feature of the invention is found in the drive systems, of which there are two primary systems. A first drive system 51 supplies motive power to the drive wheels 28, while the second provides elective power to the cutters housed in the mower deck 33.

These systems comprise a hydraulic pumping system and series of pulleys and belts and, as such, are inherently dangerous if left exposed. Loose clothing and even hair can get caught up in the belting, and fingers seem to find their way into danger when such systems are operating. It is essential, therefore, that such systems be protected against such inadvertence during operation.

It is thoroughly understood by those who work with mowers such as mower 20, that belts break, or slip, and pulleys need lubrication on a regular basis if they are to function efficiently. It is for this reason that the invention provides a rear hatch 53. The hatch 53 covers and protects the drive system 51 when the mower 20 is in motion and permits ready and convenient access when not in use, thereby permitting exceptionally fast and efficient maintenance and repair. The hatch 53 is so constructed to add structural strength to the mower when latched by inhibiting twist about the longitudinal axis thereof.

In a similar fashion, a forward deck, or floor, 55 is provided which is so structured as to support the driver and his feet in use, and further protects the driver's feet and the roving hands of others who might be in proximity, from entanglement with the belt drive 35 which is part of the drive system for the cutters within the mower deck.

To this end, the deck 55 is provided with a hinge 57 along the forward edge thereof and, by using the grip 59, which is unobtrusive so as not to inadvertently catch and damage something, yet easily gripped to rotate the deck open about the hinge 57 so as to permit access to the drive system 35. By placing the hinge forward, the deck is almost impossible to open with a driver in the driver's seat 24, adding an additional measure of safety.

The power plant, in this instance the motor M, is a constant source of maintenance and repair. The motor M of the present invention happens to be water cooled, although it is contemplated that air cooled power plants may be accommodated in essentially the same manner.

In order to facilitate both maintenance and repair, a bonnet 62 is provided and is hinged at 64 to a rear vertical structural panel 66. The bonnet 62 selectively opens to permit service and maintenance of the air filter and other power plant systems and closes to protect the same when in operation. It will also be noted that additional access is provided to the power plant, hydraulic system and the chassis by pulling the driver's seat 24 forward. The driver's seat hinges at 68 to the forward vertical structural panel 71 to accomplish this purpose.

Finally, in order to protect individuals in the immediate proximity of the motor, a housing 73 encases the exhaust system and is vented with a series of louvers, as at 75, in order to dissipate the heat therefrom.

Having thus described a preferred embodiment of the present invention, and with the clear understanding that there may be minor variations in the structure without departure from the invention, what is claimed is:

1. In a commercial riding mower having a number of operating systems:
   a chassis, including a frame, drive wheels supporting said chassis for movement along a surface to be mowed, a first drive system for moving said drive wheels, a driver's seat secured to said chassis, and steering controls accessible to a drive seated in said driver's seat;

a power plant on said chassis, a fuel storage and delivery system for supplying fuel to said power plant, said system including at least one storage tank, said chassis having wing panels, said tank being mounted within one of said wing panels, said wing panels flanking said driver's seat, said wing panels being hingeably mounted to said chassis and being selectably operable to swing laterally, with said tank, away from said chassis and said driver's seat to thereby permit maintenance and service of said fuel storage and delivery system.

2. The commercial riding mower of claim 1, wherein a bonnet is provided on said chassis above said power plant, said bonnet being hinged to said chassis and swingable to an openable position to expose said power plant.

3. The commercial riding mower of claim 1, wherein a panel is provided at the rear of said chassis, said panel covering said drive system, and said panel being selectively hinged to the said chassis to be swingable outwardly to expose said first drive system for service and maintenance.

4. The commercial riding mower of claim 1, wherein a drive system for rotary cutters system is provided, a deck covering said drive system for rotary cutters system said deck being selectively openable to provide access to said drive system for rotary cutters system for service and maintenance thereof.

5. The commercial riding mower of claim 1, wherein said fuel storage and delivery system includes two storage tanks, each of said tanks being mounted in a said wing panel flanking said driver's seat.

6. In a commercial riding mower having a chassis, including a frame, drive wheels supporting said chassis for movement along surface to be mowed;

a source of motive power in the form of a power plant;

a driver's seat secured to said chassis and steering controls accessible to an operator in said driver's seat to steer the mower;

said commercial riding mower additionally having an amalgam of operating systems within said chassis, each of said operating systems being disposed behind a panel on said chassis, said panels hingeable to said chassis to be selectively openable outwardly to service and maintain said operating systems, said panels being normally closed to protect inadvertent contact with said driving systems and maintaining structural integrity of the chassis;

said operating systems including a fuel storage and delivery system, a drive system, a rotary cutter system, including a drive system therefor;

said panels including a pair of wing panels, said fuel storage and delivery system mounted to and protectively disposed on the inside wall of said wing panels.

7. The commercial riding mower of claim 6, wherein said wing panels house said fuel storage and delivery system, which include two storage tanks, each of said tanks being disposed on the inside wall of one of said wing panels flanking said driver's seat.

* * * * *